US009001108B2

(12) United States Patent
Jang

(10) Patent No.: US 9,001,108 B2
(45) Date of Patent: Apr. 7, 2015

(54) SCAN DRIVING DEVICE FOR A DISPLAY DEVICE AND DRIVING METHOD THEREOF

(75) Inventor: Hwan-Soo Jang, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 211 days.

(21) Appl. No.: 13/572,992

(22) Filed: Aug. 13, 2012

(65) Prior Publication Data

US 2013/0207956 A1 Aug. 15, 2013

(30) Foreign Application Priority Data

Feb. 13, 2012 (KR) ........................ 10-2012-0014348

(51) Int. Cl.
*G06F 3/038* (2013.01)
*G06F 3/041* (2006.01)
*G09G 3/32* (2006.01)

(52) U.S. Cl.
CPC ...... *G09G 3/3266* (2013.01); *G09G 2310/0283* (2013.01)

(58) Field of Classification Search
CPC .............. G09G 3/3266; G09G 3/3677; G09G 2330/021; G06F 3/038
See application file for complete search history.

(56) References Cited

U.S. PATENT DOCUMENTS

2010/0271363 A1* 10/2010 Chung .......................... 345/213

FOREIGN PATENT DOCUMENTS

KR 10-2007-0083073 A 8/2007
KR 10-2010-0087870 A 8/2010
KR 10-2011-0037537 A 4/2011
KR 10-2011-0066594 A 6/2011

* cited by examiner

*Primary Examiner* — Michael Faragalla
(74) *Attorney, Agent, or Firm* — Lee & Morse, P.C.

(57) ABSTRACT

A scan driving device for a display device includes a plurality of scan drive blocks that are sequentially arranged. Each scan drive block includes a first transistor including a gate electrode connected to a first node to which a gate on voltage is transmitted according to a first clock signal, a first electrode connected to a first power source voltage, and a second electrode connected to an output terminal; a second transistor including a gate electrode connected to a second node to which a signal that is input to an input terminal is transmitted according to the first clock signal, a first electrode connected to a second clock signal input terminal, and a second electrode connected to the output terminal; and a third transistor including a gate electrode connected to the first node, a first electrode connected to the input terminal, and a second electrode connected to the second node.

20 Claims, 10 Drawing Sheets

SCAN DRIVING DEVICE FOR A DISPLAY DEVICE AND DRIVING METHOD THEREOF

CROSS-REFERENCE TO RELATED APPLICATION

This application claims priority to and the benefit of Korean Patent Application No. 10-2012-0014348 filed in the Korean Intellectual Property Office on Feb. 13, 2012, the entire contents of which are incorporated herein by reference.

BACKGROUND

1. Field

Embodiments relate to a scan driving device for a display device and a driving method thereof. More particularly, the embodiments relate to a scan driving device for a display device for minimizing a dead space of the display device and outputting a scan signal with an accurate and stable waveform and a driving method thereof.

2. Description of the Related Art

A display device includes a display panel formed of a plurality of pixels arranged in a matrix format. A display panel includes a plurality of scan lines formed in a row direction and a plurality of data lines formed in a column line, and the plurality of scan lines and the plurality of data lines are arranged to cross each other. Each of the plurality of pixels is driven by a scan signal and a data signal respectively transmitted from corresponding scan and data lines.

The display device is classified into a passive matrix type of light emitting display device and an active matrix type of light emitting display device depending on the method of driving the pixels. In view of resolution, contrast, and response time, the trend is towards the active matrix type where the respective unit pixels are selectively turned on or off.

The active matrix type organic light emitting diode display receives data signals in synchronization with the time when scan signals are transmitted to the pixels. The scan signals may be transmitted to the scan lines in the forward direction in accordance with the arrangement order of scan lines, or transmitted to the scan lines in the backward direction in accordance with the arrangement order of scan lines. As described, the conventional active scan driving apparatus performs a function of a shift resister sequentially driving scan signals.

Recently, the display panel has been increased in size, but minimization of a dead space in a product is required. The scan driving apparatus should output a scan signal having an accurate and stable waveform and minimize the dead space.

The above information disclosed in this Background section is only for enhancement of understanding of the background of the invention and therefore it may contain information that does not form the prior art that is already known in this country to a person of ordinary skill in the art.

SUMMARY

Embodiments are directed to providing a scan driving device for a display device for minimizing a dead space and outputting a scan signal with an accurate and stable waveform, and a driving method thereof.

One or more embodiments may be directed to providing a scan driving device for a display device including a plurality of scan drive blocks that are sequentially arranged, wherein the scan drive blocks respectively include: a first transistor including a gate electrode connected to a first node to which a gate on voltage is transmitted according to a clock signal that is input to a first clock signal input terminal, a first electrode connected to a first power source voltage, and a second electrode connected to an output terminal; a second transistor including a gate electrode connected to a second node to which a signal that is input to an input signal input terminal is transmitted according to the clock signal that is input to the first clock signal input terminal, a first electrode connected to a second clock signal input terminal, and a second electrode connected to the output terminal; and a third transistor including a gate electrode connected to the first node, a first electrode connected to the input signal input terminal, and a second electrode connected to the second node.

The scan driving device may further include a fourth transistor including a gate electrode connected to the first clock signal input terminal, a first electrode connected to the input signal input terminal, and a second electrode connected to the second node.

The scan driving device may further include a fifth transistor including a gate electrode connected to the first clock signal input terminal, a first electrode connected to the first clock signal input terminal, and a second electrode connected to the first node.

The scan driving device may further include a fifth transistor including a gate electrode connected to the first clock signal input terminal, a first electrode connected to the second power source voltage, and a second electrode connected to the first node.

The scan driving device may further include a sixth transistor including a gate electrode connected to the second node, a first electrode connected to the first clock signal input terminal, and a second electrode connected to the first node.

The scan driving device may further include a first capacitor including a first electrode connected to the second node and a second electrode connected to the output terminal.

The scan driving device may further include a second capacitor including a first electrode connected to the first node and a second electrode connected to the first power source voltage.

The input signal input terminal may include a first input signal input terminal for receiving a scan signal of a scan drive block that is preemptively arranged from among the plurality of scan drive blocks, and a second input signal input terminal for receiving a scan signal of a scan drive block that is arranged afterward.

The scan driving device further may include a seventh transistor including a gate electrode connected to a forward control signal input terminal for receiving a forward control signal for instructing a forward scan drive, a first electrode connected to the first input signal input terminal, and a second electrode connected to the first electrode of the third transistor.

The scan driving device may further include an eighth transistor including a gate electrode connected to a reverse control signal input terminal for receiving a reverse control signal for instructing a reverse scan drive, a first electrode connected to the second input signal input terminal, and a second electrode connected to the first electrode of the third transistor.

One or more embodiments may be directed to providing a method for driving a scan driving device including a plurality of scan drive blocks including a first transistor having a gate electrode connected to a first node to which a gate on voltage is transmitted according to a clock signal that is input to a first clock signal input terminal and transmitting a first power source voltage to an output terminal, a second transistor having a gate electrode connected to a second node and transmitting a clock signal that is input to a second clock signal input terminal to the output terminal, and a third transistor having a gate electrode connected to the first node and transmitting a signal that is input to an input signal input terminal to the second node, including: applying the clock signal that is input to the first clock signal input terminal and the signal that is input to the input signal input terminal as a gate on voltage, and applying the clock signal that is input to second clock signal input terminal as a gate off voltage; transmitting the gate on voltage to the first node according to the clock signal that is input to the first clock signal input terminal and transmitting the signal that is input to the input signal input terminal to the second node to reset the first node and the second node with the gate on voltage; and outputting a scan signal of a gate off voltage to the output terminal through the first transistor and the second transistor.

The method may further include charging a first capacitor connected to the second node and the output terminal by a gate on voltage at the second node and a gate off voltage at the output terminal.

The method may further include: applying the clock signal that is input to the first clock signal input terminal and the signal that is input to the first input signal input terminal as a gate off voltage, and applying the clock signal that is input to the second clock signal input terminal as a gate on voltage; and outputting the clock signal that is input to the second clock signal input terminal to the output terminal as a scan signal of the gate on voltage by a bootstrap caused by the first capacitor.

The method may further include: transmitting the clock signal that is input to the first clock signal input terminal to the first node by the bootstrap caused by the first capacitor; and turning off the first transistor and the third transistor.

The method may further include: when the scan signal with the gate on voltage is output, applying the clock signal that is input to the first clock signal input terminal as the gate on voltage, and applying the signal that is input to the input signal input terminal as the gate off voltage; transmitting the gate on voltage to the first node by the clock signal that is input to the first clock signal input terminal; turning on the third transistor to transmit the gate off voltage to the second node; and turning on the first transistor to output the scan signal with the gate off voltage to the output terminal.

The method may further include charging a second capacitor connected to the first node and the first power source voltage with the gate on voltage at the first node and the gate off voltage at the output terminal.

The method may further include maintaining the first transistor and the third transistor in the turned on state by the voltage charged in the second capacitor.

The input signal input terminal may include a first input signal input terminal for receiving a scan signal of a preemptively arranged scan drive block from among the scan drive blocks and a second input signal input terminal for receiving a scan signal of a scan drive block that is arranged afterward, and the transmitting of the signal that is input to the input signal input terminal to the second node includes transmitting a signal that is input to the first input signal input terminal to the second node according to a forward control signal for instructing a forward scan drive.

The input signal input terminal may include a first input signal input terminal for receiving a scan signal of a preemptively arranged scan drive block from among the scan drive blocks and a second input signal input terminal for receiving a scan signal of a scan drive block that is arranged afterward, and the transmitting of the signal that is input to the input signal input terminal to the second node includes transmitting a signal that is input to the second input signal input terminal to the second node according to a reverse control signal for instructing a reverse scan drive.

DETAILED DESCRIPTION

Figure 1:
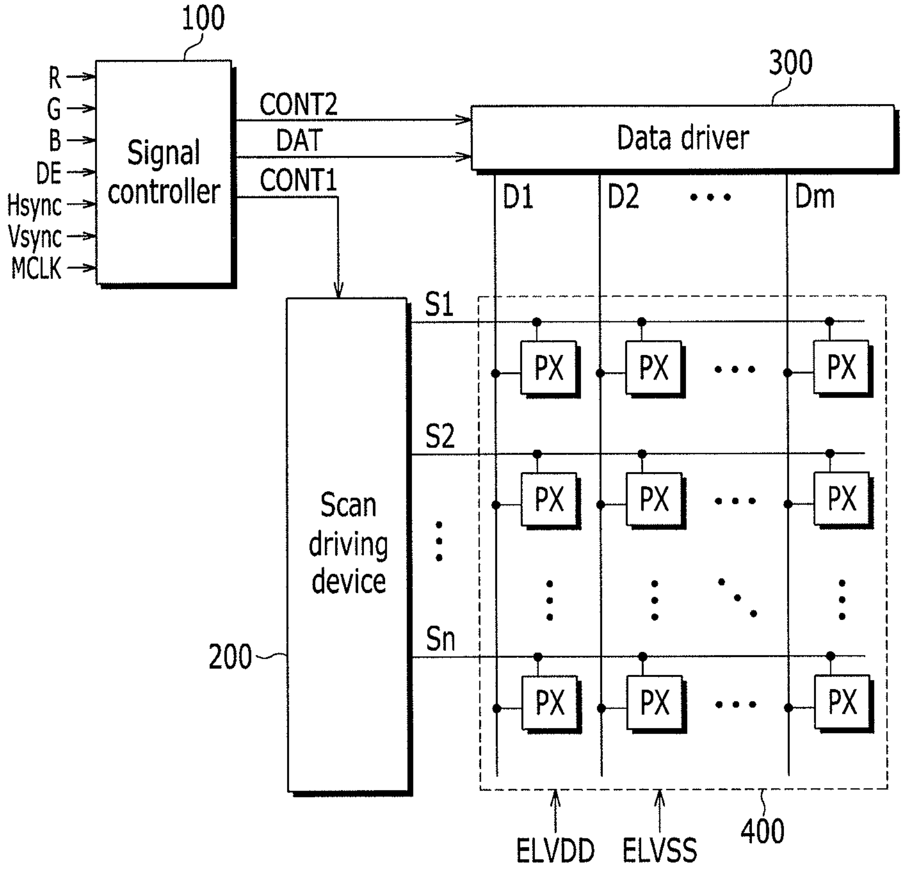
FIG. 1 shows a block diagram of a display device according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In various exemplary embodiments, the same reference numerals are used for elements having the same configurations and will be representatively described in a first exemplary embodiment, and in other exemplary embodiments, only elements different from those of previous exemplary embodiments will be described.

Parts that are irrelevant to the description are omitted in order to clearly describe embodiments, and like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

FIG. 1 shows a block diagram of a display device according to an exemplary embodiment. Referring to FIG. 1, the display device includes a signal controller 100, a scan driving device 200, a data driver 300, and a display 400.

The signal controller 100 receives video signals (R, G, B) from an external device and an input control signal for controlling display of the video signals (R, G, B). The video signals (R, G, B) have luminance information on respective pixels (PX) of the display 400, e.g., the luminance has $1024=2^{10}$, $256=2^{8}$, or $64=2^{6}$ grayscales. The input control signal exemplarily includes a vertical synchronization signal (Vsync), a horizontal synchronization signal (Hsync), a main clock signal (MCLK), and a data enable signal (DE).

The signal controller 100 processes the input video signals (R, G, B) according to operational conditions of the display 400 and the data driver 300 based on the input video signals (R, G, B) and the input control signal, and generates a scan control signal (CONT1), a data control signal (CONT2), and an image data signal (DAT). The signal controller 100 transmits the scan control signal (CONT1) to the scan driving device 200. The signal controller 100 transmits the data control signal (CONT2) and the image data signal (DAT) to the data driver 300.

The display 400 includes a plurality of pixels (PX) connected to a plurality of scan lines S1-Sn, a plurality of data lines D1-Dm, and a plurality of signal lines (S1-Sn, D1-Dm,) and arranged in a matrix form. The scan lines S1-Sn extend in a substantially row direction and in parallel with each other. The data lines D1-Dm extend in a substantially column direction and in parallel with each other. The pixels (PX) of the display 400 receive a first power source voltage (ELVDD) and a second power source voltage (ELVSS) from an external device.

The scan driving device 200 is connected to the scan lines S1-Sn, and applies the scan signal, a combination of a gate on voltage (Von) for turning on application of the data signal to the pixel (PX) and a gate off voltage (Voff) for turning the same off according to the scan control signal (CONT1) to the scan lines S1-Sn.

The scan control signal (CONT1) includes a scan start signal (SSP) and a clock signal (CLK). The scan start signal (SSP) generates a first scan signal for displaying a one-frame image. The clock signal (CLK) represents a synchronization signal for sequentially applying the scan signal to the scan lines S1-Sn.

The scan driving device 200 can be driven according to a forward-direction scan drive method for applying the scan signal with the gate on voltage in the forward direction from the first scan line (S1) to the last scan line (Sn). Also, the scan driving device 200 can be driven according to a reverse-direction scan drive method for applying the scan signal with the gate on voltage in the reverse direction from the last scan line (Sn) to the first scan line (S1). The scan driving device 200 can be driven by the forward scan drive method or reverse scan drive method according to the scan control signal (CONT1). In this instance, the scan control signal (CONT1) can further include a forward control signal (CTL) for instructing a forward scan drive and a reverse control signal (CTLB) for instructing a reverse scan drive.

The data driver 300 is connected to the data lines D1-Dm, and selects a gray voltage according to the image data signal (DAT). The data driver 300 applies the selected gray voltage as a data signal to the data lines D1-Dm according to the data control signal (CONT2).

The driving devices 100, 200, and 300 can be installed as at least one integrated circuit chip outside a pixel area, installed on a flexible printed circuit film, attached to the display 400 as a tape carrier package (TCP), installed on an additional printed circuit board (PCB), or integrated outside the pixel area together with the signal lines (S1-Sn, D1-Dm).

Figure 2:
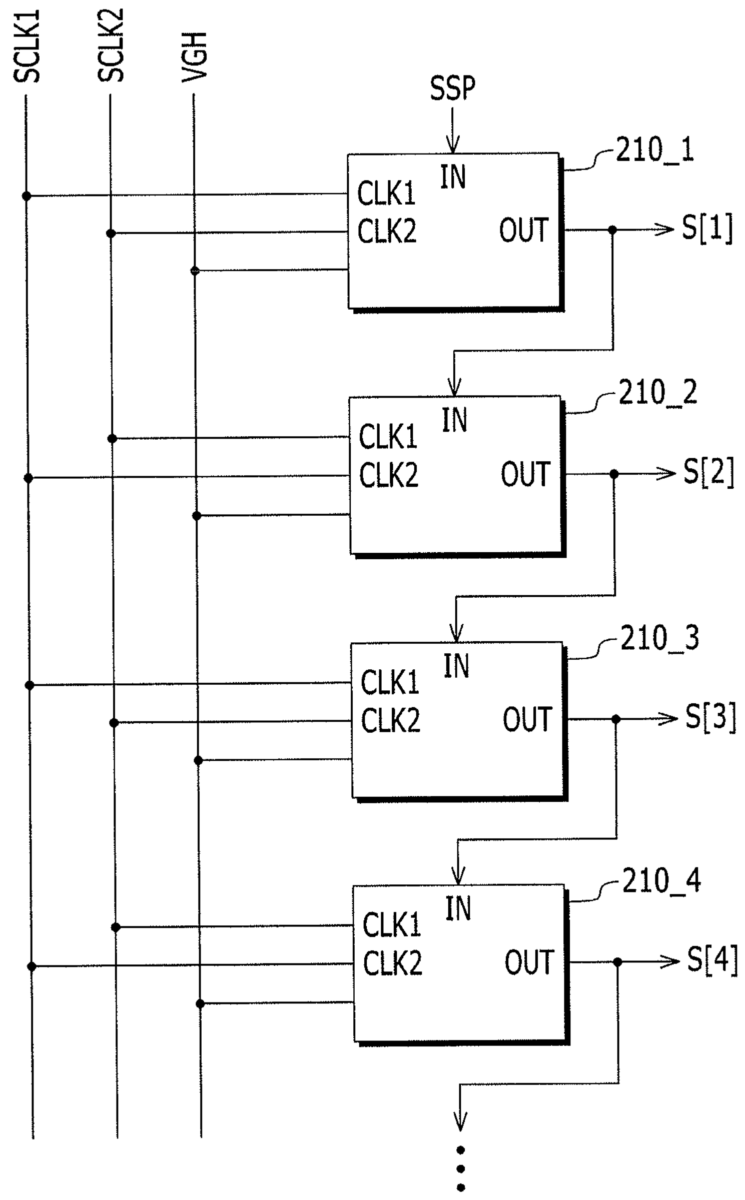
FIG. 2 shows a block diagram of a scan driving device according to an exemplary embodiment.

FIG. 2 shows a block diagram of a scan driving device according to an exemplary embodiment. Referring to FIG. 2, the scan driving device includes a plurality of scan drive blocks (210_1, 210_2, 210_3, 210_4, . . . ) that are sequentially arranged. The respective scan drive blocks (210_1, 210_2, 210_3, 210_4, . . . ) generate scan signals (S[1], S[2], S[3], S[4], . . . ) that are transmitted to the scan lines S1-Sn.

The scan drive blocks (210_1, 210_2, 210_3, 210_4, . . . ) respectively include a first clock signal input terminal CLK1, a second clock signal input terminal CLK2, an input signal input terminal (IN), and an output terminal (OUT). Among the scan drive blocks (210_1, 210_2, 210_3, 210_4, . . . ), odd-numbered scan drive blocks (210_1, 210_3, . . . ) receive the first clock signal (SCLK1) at the first clock signal input terminal CLK1, and receive the second clock signal (SCLK2) at the second clock signal input terminal CLK2. Among the scan drive blocks (210_1, 210_2, 210_3, 210_4, . . . ), the first clock signal input terminals CLK1 of the even-numbered scan drive blocks (210_2, 210_4, . . . ) receive the second clock signal (SCLK2), and the second clock signal input terminals CLK2 receive the first clock signal (SCLK1).

The scan drive blocks (210_1, 210_2, 210_3, 210_4, . . . ) sequentially output scan signals (S[1], S[2], S[3], S[4], . . . ) by the first clock signal (SCLK1), the second clock signal (SCLK2), the signal input to the input signal input terminal (IN), and the power source voltage (VGH). The first scan drive block 210_1 transmits the scan signal (S[1]) generated by receiving the scan start signal (SSP) to the input signal input terminal (IN) of the first scan line S1 and the second scan drive block 210_2. The k-th scan drive block (210_*k*) outputs the scan signal (S[k]) (where $1<k<=n$) generated by receiving the scan signal (S[k−1]) output by the (k−1)-th scan drive block (210_*k*−1).

The above-described scan driving device 200 can be connected to the first clock signal line for transmitting the first clock signal (SCLK1), the second clock signal line for transmitting the second clock signal (SCLK2), and the power line for transmitting the power source voltage (VGH). Accordingly, the scan driving device 200 can reduce the number of wires and can minimize the dead space compared to existing scan driving devices. The scan driving device 200 can output the accurate and stable scan signal through a simple operation.

A scan driving circuit included in the scan drive blocks (210_1, 210_2, 210_3, 210_4, . . . ) will now be described with reference to FIG. 3, and a method for driving a scan driving device 200 will now be described with reference to FIG. 4.

Figure 3:
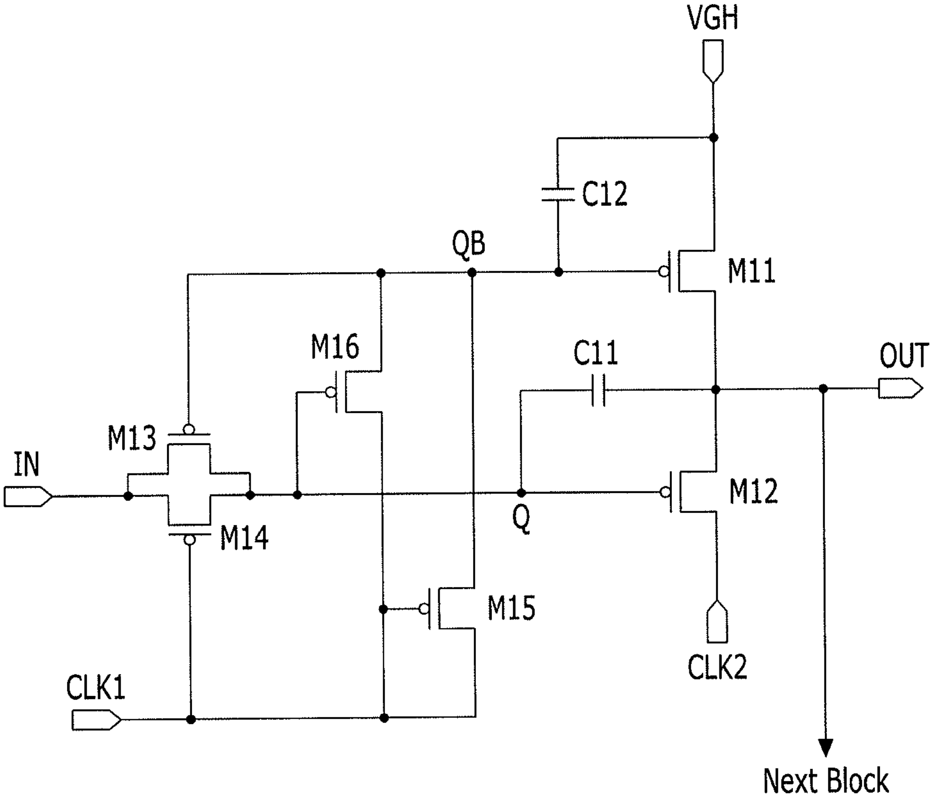
FIG. 3 shows circuit diagram of a scan drive block included in a scan driving device shown in FIG. 2 according to an exemplary embodiment.

FIG. 3 shows circuit diagram of a scan drive block included in a scan driving device shown in FIG. 2 according to an exemplary embodiment. Referring to FIG. 3, the scan drive block includes a plurality of transistors (M11, M12, M13, M14, M15, M16) and a plurality of capacitors C11 and C12.

The first transistor M11 includes a gate electrode connected to a first node (QB), a first electrode connected to the power source voltage (VGH), and a second electrode connected to the output terminal (OUT).

The second transistor M12 includes a gate electrode connected to a second node (Q), a first electrode connected to the second clock signal input terminal CLK2, and a second electrode connected to the output terminal (OUT).

The third transistor M13 includes a gate electrode connected to the first node (QB), a first electrode connected to the input signal input terminal (IN), and a second electrode connected to the second node (Q).

The fourth transistor M14 includes a gate electrode connected to the first clock signal input terminal CLK1, a first electrode connected to the input signal input terminal (IN), and a second electrode connected to the second node (Q).

The fifth transistor M15 includes a gate electrode connected to the first clock signal input terminal CLK1, a first electrode connected to the first clock signal input terminal CLK1, and a second electrode connected to the first node (QB).

The sixth transistor M16 includes a gate electrode connected to the second node (Q), a first electrode connected to the first clock signal input terminal CLK1, and a second electrode connected to the first node (QB).

The first capacitor C11 includes a first electrode connected to the second node (Q) and a second electrode connected to the output terminal (OUT).

The second capacitor C12 includes a first electrode connected to the first node (QB) and a second electrode connected to the power source voltage (VGH).

The power source voltage (VGH) has a logic high level voltage (referred to as a high voltage hereinafter.)

The transistors (M11, M12, M13, M14, M15, M16) include p-channel field effect transistors. The gate on voltage for turning on the transistors (M11, M12, M13, M14, M15, M16) represents a logic low level voltage (referred to as a low voltage hereinafter) and the gate off voltage for turning them off represent the high voltage. Alternatively, the transistors (M11, M12, M13, M14, M15, M16) can be n-channel field effect transistors and, in this instance, the gate on voltage for turning on the n-channel field effect transistors represent the high voltage and the gate off voltage for turning them off represents the low voltage.

Figure 4:
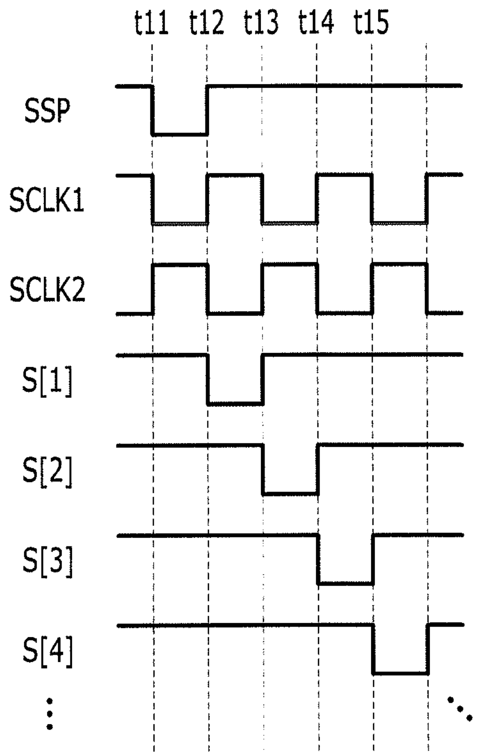
FIG. 4 shows a timing diagram of a method for driving a scan driving device shown in FIG. 2.

FIG. 4 shows a timing diagram of a method for driving a scan driving device shown in FIG. 2. Referring to FIG. 2 to FIG. 4, an operation of the first scan drive block 210_1 will now be described.

In the interval of t11-t12, the scan start signal (SSP) and the first clock signal (SCLK1) are applied as a low voltage, and the second clock signal (SCLK2) is applied as a high voltage. The fourth transistor M14 and the fifth transistor M15 are turned on by the first clock signal (SCLK1). The first low clock signal (SCLK1) input to the first clock signal input terminal CLK1 is transmitted to the first node (QB) through the turned on fifth transistor M15. The first node (QB) is reset to be the low voltage. The first transistor M11 and the third transistor M13 are turned on by the low voltage of the first node (QB). The low scan start signal (SSP) input to the input signal input terminal (IN) is transmitted to the second node (Q) through the turned on third transistor M13 and the turned on fourth transistor M14. The second node (Q) is reset to be the low voltage. By the low voltage at the second node (Q), the second transistor M12 is turned on, and the high second clock signal (SCLK2) input to the second clock signal input terminal CLK2 is transmitted to the output terminal (OUT). In this instance, the first capacitor C11 is charged by the high voltage at the output terminal (OUT) and the low voltage at the second node (Q). The power source voltage (VGH) is transmitted to the output terminal (OUT) through the turned on first transistor M11 and the high scan signal (S[1]) is output.

In the interval of t12-t13, the scan start signal (SSP) and the first clock signal (SCLK1) are applied as a high voltage, and the second clock signal (SCLK2) is applied as a low voltage. The fourth transistor M14 and the fifth transistor M15 are turned off by the first clock signal (SCLK1). At the time t12, the second clock signal (SCLK2) is changed to the low voltage from the high voltage so the voltage at the second node (Q) is reduced to be less than the low voltage by a bootstrap of the first capacitor C11 and the second transistor M12 is turned on. The low second clock signal (SCLK2) is transmitted to the output terminal (OUT) through the turned on second transistor M12 and the low scan signal (S[1]) is output. In this instance, the sixth transistor M16 is turned on by the voltage at the second node (Q), and the high first clock signal (SCLK1) input to the first clock signal input terminal CLK1 is transmitted to the first node (QB). The first transistor M11 is turned off by the high voltage at the first node (QB).

In the interval of t13-t14, the first clock signal (SCLK1) is applied as a low voltage, and the scan start signal (SSP) and the second clock signal (SCLK2) are applied as a high voltage. The fourth transistor M14 and the fifth transistor M15 are turned on by the first clock signal (SCLK1). The low voltage is applied to the first node (QB) through the turned on fifth transistor M15. The first transistor M11 and the third transistor M13 are turned on by the low voltage at the first node (QB). The power source voltage (VGH) is transmitted to the output terminal (OUT) through the turned on first transistor M11 and the high scan signal (S[1]) is output. In this instance, the high voltage is transmitted to the second node (Q) through the turned on third transistor M13 and the fourth transistor M14, and the second transistor M12 is turned off. The second capacitor C12 is charged with the high voltage of the output terminal (OUT) and the low voltage at the first node (QB).

In the interval of t14-t15, the scan start signal (SSP) and the first clock signal (SCLK1) are applied as the high voltage, and the second clock signal (SCLK2) is applied as the low voltage. The fourth transistor M14 and the fifth transistor M15 are turned off by the first clock signal (SCLK1). When the second clock signal (SCLK2) is changed to the low voltage from the high voltage, the voltage at the second node (Q) can be changed to be less than the high voltage and it is not changed to be the low voltage for turning on the sixth transistor M16. Therefore, the first node (QB) floats, and the first transistor M11 and the third transistor M13 are turned on by the voltage stored in the second capacitor C12. The power source voltage (VGH) is transmitted to the output terminal (OUT) through the first transistor M11 and the high scan signal (S[1]) is output. The high voltage input to the input signal input terminal (IN) is transmitted to the second node (Q) through the fourth transistor M14 and the voltage at the second node (Q) is maintained at the high level. Accordingly, while the high scan signal (S[1]) is output, trembling of the voltage level of the scan signal (S[1]) can be prevented by the clock signal (SCLK2) input to the second clock signal input terminal CLK2.

The second clock signal (SCLK2) that is delayed by 1 duty than the first clock signal (SCLK1) is input to the first clock signal input terminal CLK1 of the second scan drive block 210_2. The first clock signal (SCLK1) that is delayed by 1 duty than the second clock signal (SCLK2) is input to the second clock signal input terminal CLK2 of the second scan drive block 210_2. The scan signal (S[1]) of the first scan drive block 210_1 that is delayed by 1 duty than the scan start signal (SSP) is input to the input signal input terminal (IN) of the second scan drive block 210_2. Therefore, the second scan drive block 210_2 outputs the low scan signal (S[2]) in the interval of t13-t14 that is delayed by 1 duty than the interval of t12-t13 during which the scan signal (S[1]) of the first scan drive block 210_1 with the gate on voltage is applied. The duty represents an interval during which the clock signal of the gate on voltage for turning on the transistor included in the scan drive blocks (210_1, 210_2, 210_3, 210_4, . . . ) is supplied.

In a like manner, a plurality of scan drive blocks (210_1, 210_2, 210_3, 210_4, . . . ) sequentially output the low scan signals (S[1], S[2], S[3], S[4], . . . ).

Figure 5:
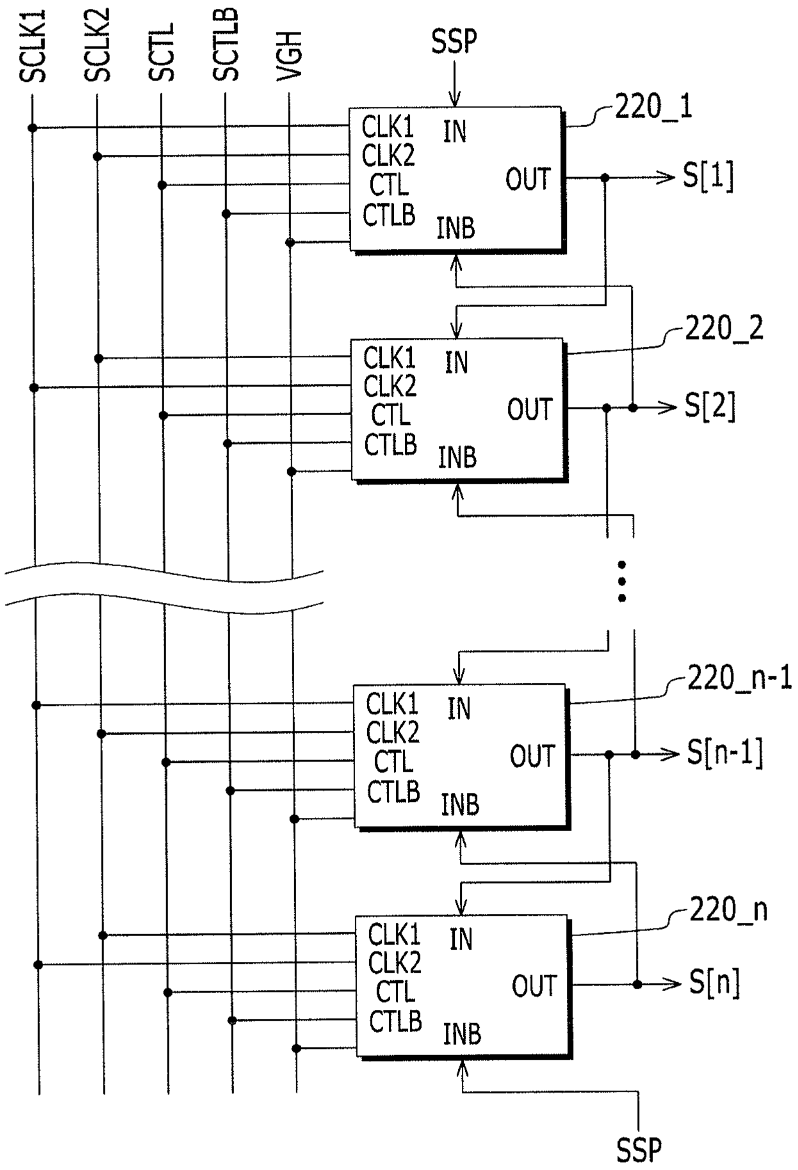
FIG. 5 shows a block diagram of a scan driving device according to an exemplary embodiment.

FIG. 5 shows a block diagram of a scan driving device according to another exemplary embodiment. Referring to FIG. 5, the scan driving device includes a plurality of scan drive blocks (220_1, 220_2, . . . , 220_n−1, 220_n) that are sequentially arranged. The scan driving device can generate scan signals (S[1], S[2], . . . , S[n−1], S[n]) that are transmitted to the scan line S1-Sn according to the forward scan drive method or the reverse scan drive method.

The scan drive blocks (220_1, 220_2, . . . , 220_*n*−1, 220_*n*) respectively include a first clock signal input terminal CLK1, a second clock signal input terminal CLK2, a forward control signal input terminal (CTL), a reverse control signal input terminal (CTLB), a forward input signal input terminal (IN), a reverse input signal input terminal (INB), and an output terminal (OUT).

Among the scan drive blocks (220_1, 220_2, . . . , 220_*n*−1, 220_*n*), the first clock signal (SCLK1) is input to first clock signal input terminals CLK1 of odd-numbered scan drive blocks (220_1, . . . , 220_*n*−1), and the second clock signal (SCLK2) is input to the second clock signal input terminals CLK2. Among the scan drive blocks (220_1, 220_2, . . . , 220_*n*−1, 220_*n*), the second clock signal (SCLK2) is input to first clock signal input terminals CLK1 of even-numbered scan drive block (220_2, . . . , 220_*n*), and the first clock signal (SCLK1) is input to the second clock signal input terminals CLK2.

A forward control signal (SCTL) for controlling the forward scan drive method is input to the forward control signal input terminal (CTL) of the scan drive blocks (220_1, 220_2, . . . , 220_*n*−1, 220_*n*). A reverse control signal (SCTLB) for controlling the reverse scan drive method is input to the reverse control signal input terminal (CTLB) of the scan drive blocks (220_1, 220_2, . . . , 220_*n*−1, 220_*n*).

The scan signal of the arranged scan drive block is input to the forward input signal input terminals (IN) of the scan drive blocks (220_1, 220_2, . . . , 220_*n*−1, 220_*n*). The scan signal of the arranged scan drive block is input to the reverse input signal input terminal (INB) of the scan drive blocks (220_1, 220_2, . . . , 220_*n*−1, 220_*n*). When the scan drive blocks (220_1, 220_2, . . . , 220_*n*−1, 220_*n*) output scan signals according to the forward scan drive method, the scan start signal (SSP) can be input to the forward input signal input terminal (IN) of the first scan drive block 220_1. When the scan drive blocks (220_1, 220_2, . . . , 220_*n*−1, 220_*n*) output the scan signal according to the reverse scan drive method, the scan start signal (SSP) can be input to the reverse input signal input terminal (INB) of the n-th scan drive block 220_*n*.

The scan drive blocks (220_1, 220_2, . . . , 220_*n*−1, 220_*n*) can sequentially output the scan signals (S[1], S[2], . . . , S[n−1], S[n]) in the forward direction or the reverse direction according to the first clock signal (SCLK1), the second clock signal (SCLK2), the forward control signal (SCTL), the reverse control signal (SCTLB), the signal input to the forward input signal input terminal (IN), and the signal and the power voltage (VGH) input to the reverse input signal input terminal (INB).

Figure 6:
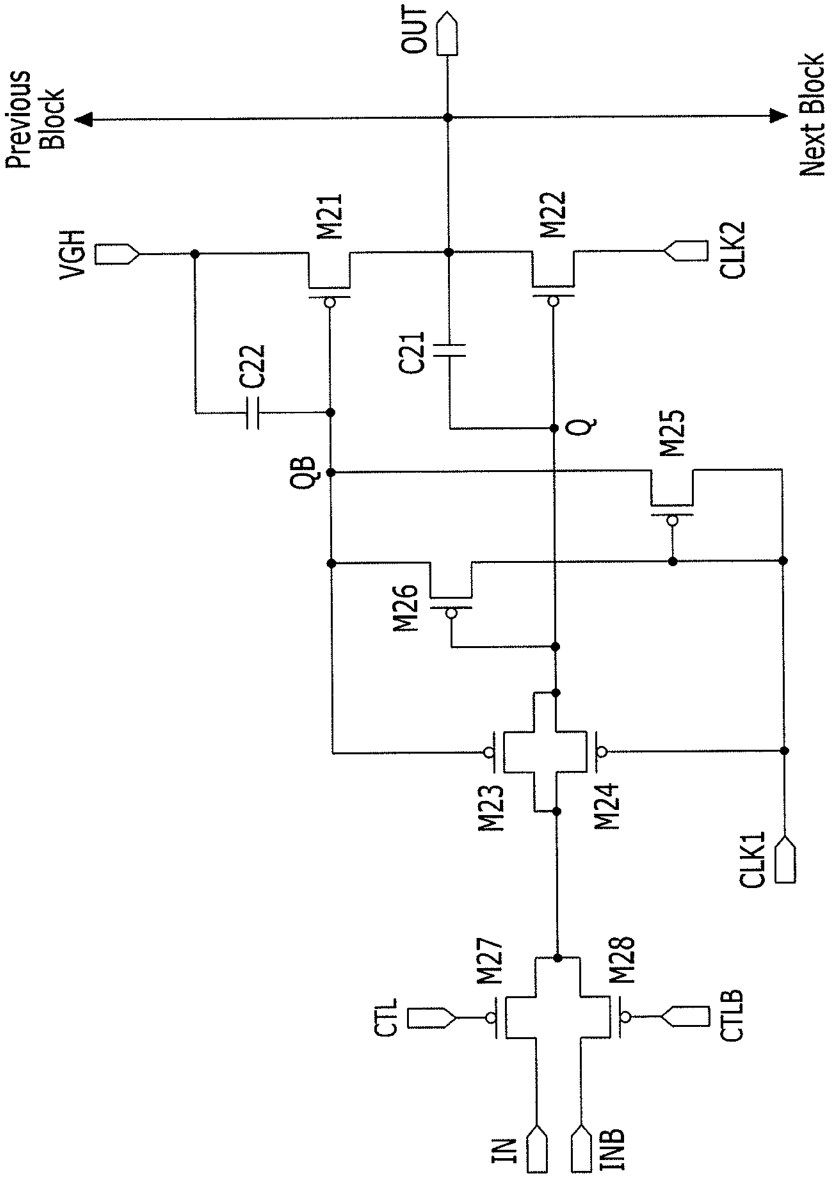
FIG. 6 shows a circuit diagram of a scan drive block included in a scan driving device shown in FIG. 5 according to an exemplary embodiment.

FIG. 6 shows a circuit diagram of a scan drive block included in a scan driving device shown in FIG. 5 according to an exemplary embodiment. Referring to FIG. 6, the scan drive block includes a plurality of transistors (M21, M22, M23, M24, M25, M26, M27, M28) and a plurality of capacitors C21 and C22.

The first transistor M21 includes a gate electrode connected to the first node (QB), a first electrode connected to the power source voltage (VGH), and a second electrode connected to the output terminal (OUT).

The second transistor M22 includes a gate electrode connected to the second node (Q), a first electrode connected to the second clock signal input terminal CLK2, and a second electrode connected to the output terminal (OUT).

The third transistor M23 includes a gate electrode connected to the first node (QB), a first electrode connected to second electrodes of the seventh transistor M27 and the eighth transistor M28, and a second electrode connected to the second node (Q).

The fourth transistor M24 includes a gate electrode connected to the first clock signal input terminal CLK1, a first electrode connected to the second electrodes of the seventh transistor M27 and the eighth transistor M28, and a second electrode connected to the second node (Q).

The fifth transistor M25 includes a gate electrode connected to the first clock signal input terminal CLK1, a first electrode connected to the first clock signal input terminal CLK1, and a second electrode connected to the first node (QB).

The sixth transistor M26 includes a gate electrode connected to the second node (Q), a first electrode connected to the first clock signal input terminal CLK1, and a second electrode connected to the first node (QB).

The seventh transistor M27 includes a gate electrode connected to the forward control signal input terminal (CTL), a first electrode connected to the forward input signal input terminal (IN), and a second electrode connected to the first electrodes of the third transistor M23 and the fourth transistor M24.

The eighth transistor M28 includes a gate electrode connected to the reverse control signal input terminal (CTLB), a first electrode connected to the reverse input signal input terminal (INB), and a second electrode connected to the first electrodes of the third transistor M23 and the fourth transistor M24.

The first capacitor C21 includes a first electrode connected to the second node (Q) and a second electrode connected to the output terminal (OUT).

The second capacitor C22 includes a first electrode connected to the first node (QB) and a second electrode connected to the power source voltage (VGH).

The power source voltage (VGH) is a high voltage.

Compared to the scan drive block shown in FIG. 3, the scan drive block further includes the seventh transistor M27 for transmitting the signal that is input to the forward input signal input terminal (IN) according to the forward control signal (SCTL) and the eighth transistor M28 for transmitting the signal that is input to the reverse input signal input terminal (INB) according to the reverse control signal (SCTLB). When the scan driving device is driven by the forward scan driving method, the seventh transistor M27 is turned on and the eighth transistor M28 is turned off. When the scan driving device is driven by the reverse scan driving method, the eighth transistor M28 is turned on and the seventh transistor M27 is turned off.

The transistors (M21, M22, M23, M24, M25, M26, M27, M28) are p-channel field effect transistors. The gate on voltage for turning on the transistors (M21, M22, M23, M24, M25, M26, M27, M28) is the low voltage and the gate off voltage for turning them off is the high voltage. The transistors (M21, M22, M23, M24, M25, M26, M27, M28) can be n-channel field effect transistors, and in this instance, the gate on voltage for turning on the n-channel field effect transistors is the high voltage and the gate off voltage for turning them off is the low voltage.

Figure 7:
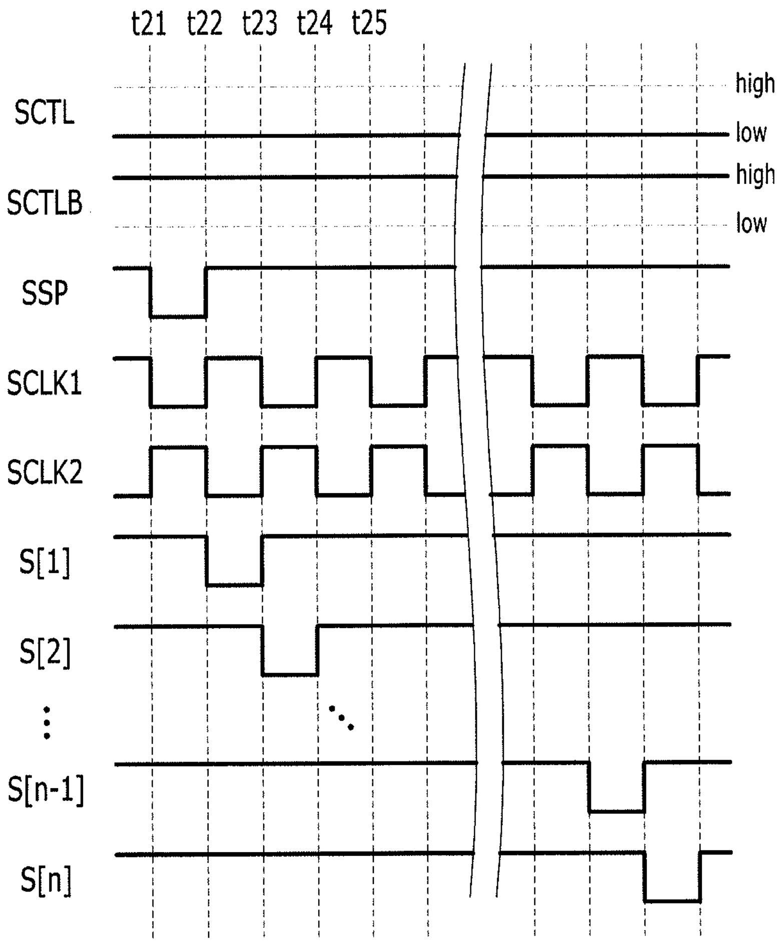
FIG. 7 shows a timing diagram of a forward scan driving method for a scan driving device shown in FIG. 5.

FIG. 7 shows a timing diagram of a forward scan driving method for a scan driving device shown in FIG. 5. Referring to FIG. 5 to FIG. 7, when the scan driving device is driven by the forward scan driving method, the forward control signal (SCTL) is applied as a low voltage for turning on the seventh transistor M27, and the reverse control signal (SCTLB) is applied as a high voltage for turning off the eighth transistor M28.

The forward control signal (SCTL) is applied as the low voltage, the reverse control signal (SCTLB) is applied as the high voltage, and a plurality of scan drive blocks (220_1, 220_2, . . . , 220_*n*−1, 220_*n*) can output scan signals (S[1], S[2], . . . , S[n−1], S[n]) with the gate on voltage according to the signal input to the forward input signal input terminal (IN). That is, the scan drive blocks (220_1, 220_2, . . . , 220_*n*−1, 220_*n*) can sequentially output the scan signals (S[1], S[2], . . . , S[n−1], S[n]) in the forward direction in a like manner shown with reference to FIG. 4.

The first scan drive block 220_1 outputs the scan signal (S[1]) with the gate on voltage in the interval of t22-t23 when the scan start signal (SSP) is input to the forward input signal input terminal (IN) in the interval of t21-t22. The second scan drive block 220_2 outputs the scan signal (S[2]) with the gate on voltage in the interval of t23-t24 when the scan signal (S[1]) with the gate on voltage of the first scan drive block 220_1 is input to the forward input signal input terminal (IN). In a like manner, the scan drive blocks (220_1, 220_2, . . . , 220_*n*−1, 220_*n*) sequentially output the scan signal (S[1], S[2], . . . , S[n−1], S[n]) in the forward direction.

Figure 8:
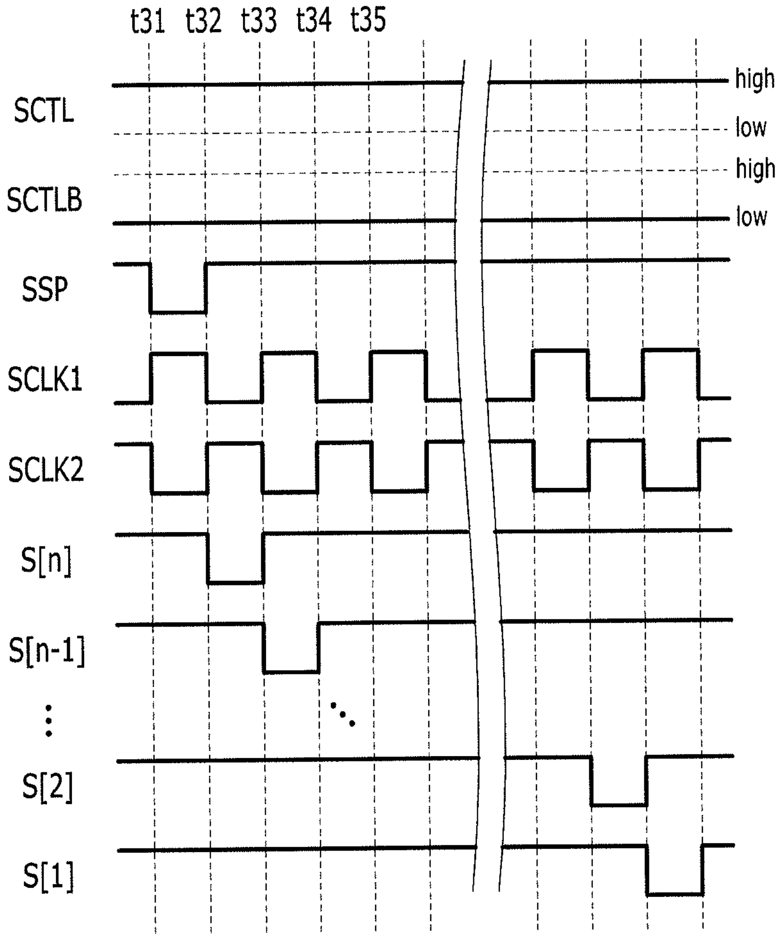
FIG. 8 shows a timing diagram of a reverse scan driving method for a scan driving device shown in FIG. 5.

FIG. 8 shows a timing diagram of a reverse scan driving method for a scan driving device shown in FIG. 5. Referring to FIG. 5, FIG. 6, and FIG. 8, when the scan driving device is driven by the reverse scan driving method, the forward control signal (SCTL) is applied as the high voltage for turning off the seventh transistor M27, and the reverse control signal (SCTLB) is applied as the low voltage for turning on the eighth transistor M28.

The forward control signal (SCTL) is applied as the high voltage and the reverse control signal (SCTLB) is applied as the low voltage so the scan drive blocks (220_1, 220_2, . . . , 220_*n*−1, 220_*n*) can output the scan signal with the gate on voltage according to the signal that is input to the reverse input signal input terminal (INB).

When the scan driving device is driven by the reverse scan driving method, the scan start signal (SSP) is input to the reverse input signal input terminal (INB) of the n-th scan drive block 220_*n*. The second clock signal (SCLK2) is input to the first clock signal input terminal CLK1 of the n-th scan drive block 220_*n*, and the first clock signal (SCLK1) is input to the second clock signal input terminal CLK2. The n-th scan drive block 220_*n* outputs the scan signal (S[n]) with the gate on voltage in the interval of t32-t33 when the scan start signal (SSP) is input to the reverse input signal input terminal (INB) in the interval of t31-t32.

The (n−1)-th scan drive block (220_*n*−1) outputs the scan signal (S[n−1]) with the gate on voltage in the interval of t33-t34 when the scan signal (S[n]) with the gate on voltage of the n-th scan drive block 220_*n* is input to the reverse input signal input terminal (INB). In a like manner, the scan drive blocks (220_1, 220_2, . . . , 220_*n*−1, 220_*n*) sequentially output the scan signals (S[n], S[n−1], . . . , S[2], S[1]) in the reverse direction.

Figure 9:
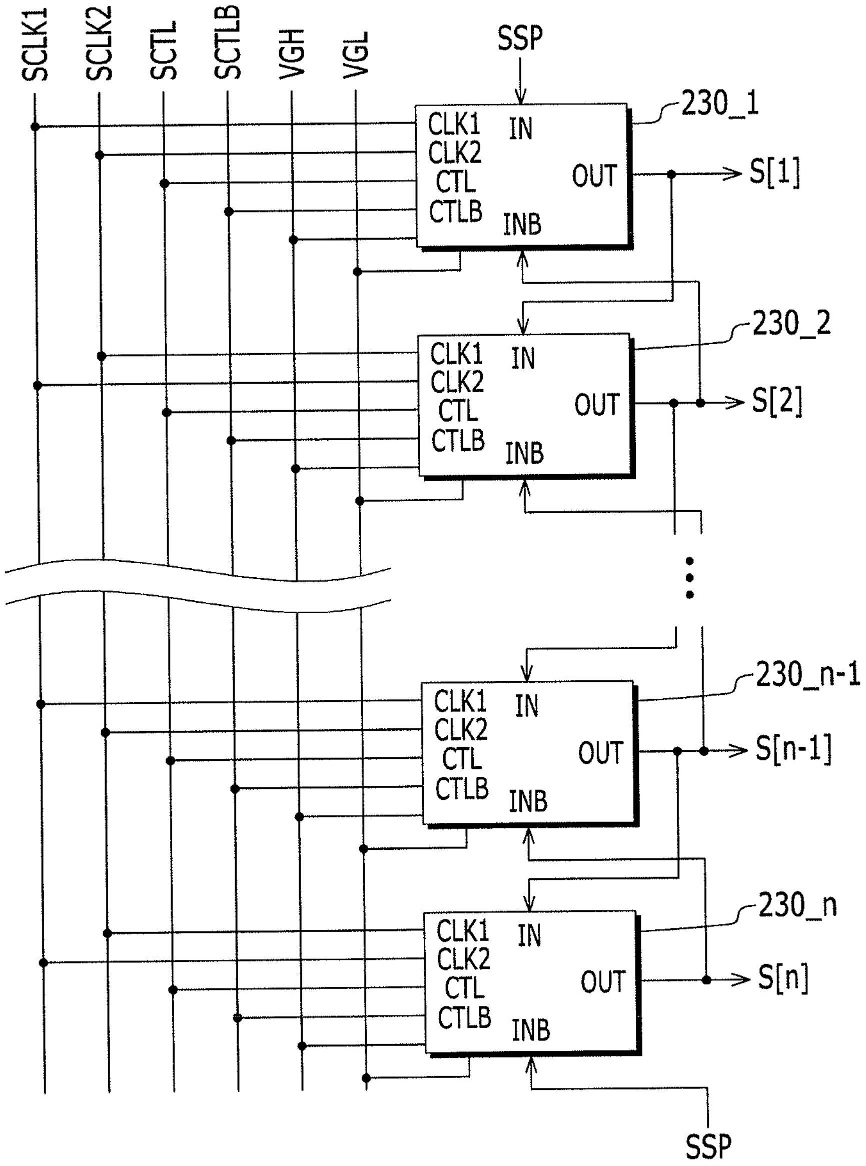
FIG. 9 shows a block diagram of a scan driving device according to an exemplary embodiment.

FIG. 9 shows a block diagram of a scan driving device according to the other exemplary embodiment. Referring to FIG. 9, the scan driving device includes a plurality of scan drive blocks (230_1, 230_2, . . . , 230*n*−1, 230_*n*) that are sequentially applied. Compared to the scan driving device of FIG. 5, a power wire for applying a second power source voltage (VGL) in the low level is added to a plurality of scan drive blocks (230_1, 230_2, . . . , 230_*n*−1, 230_*n*).

The scan drive blocks (230_1, 230_2, . . . , 230_*n*−1, 230_*n*) can sequentially output the scan signals (S[1], S[2], . . . , S[n−1], S[n]) in the forward direction or reverse direction according to the first clock signal (SCLK1), the second clock signal (SCLK2), the forward control signal (SCTL), the reverse control signal (SCTLB), the signal input to the forward input signal input terminal (IN), the signal input to the reverse input signal input terminal (INB), the first power source voltage (VGH), and the second power source voltage (VGL).

Figure 10:
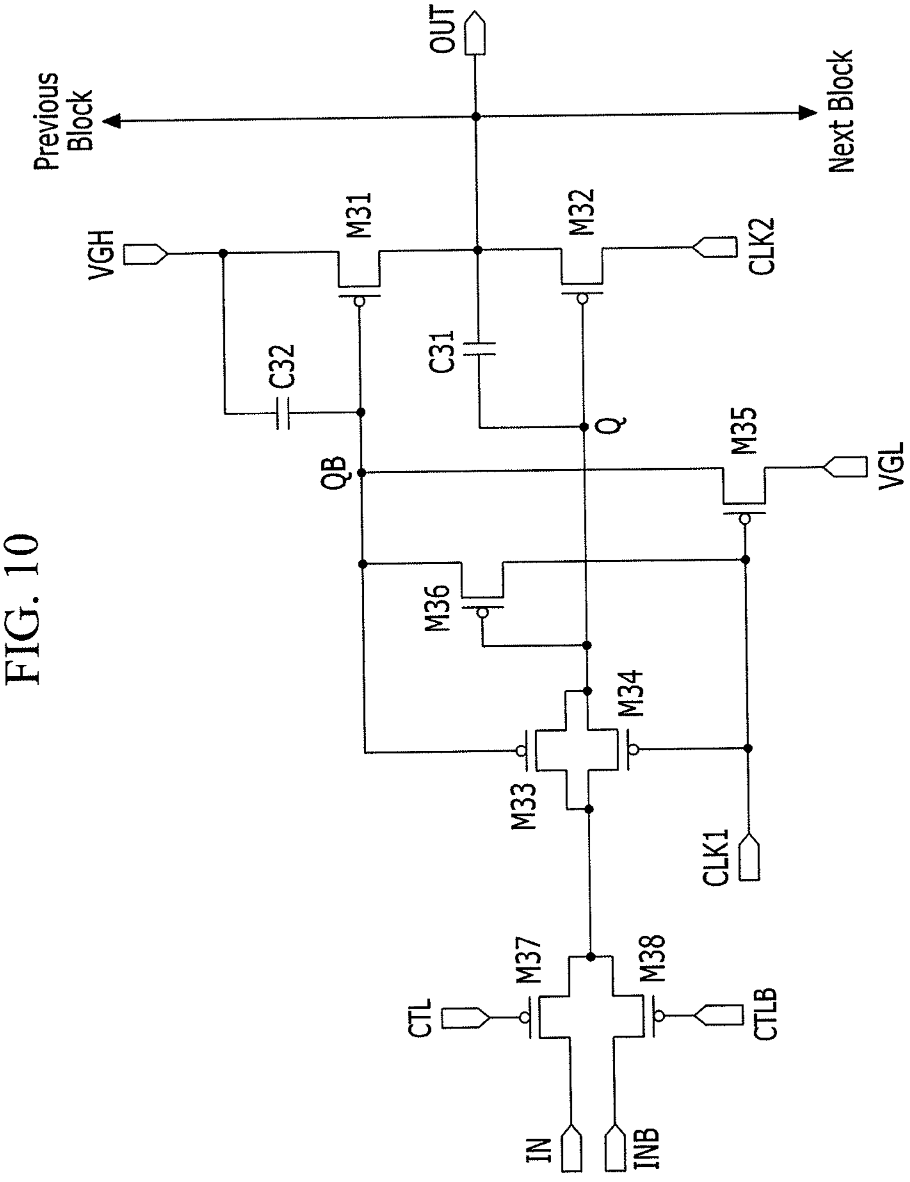
FIG. 10 shows a circuit diagram of a scan drive block included in a scan driving device shown in FIG. 9 according to an exemplary embodiment of the present invention.

FIG. 10 shows a circuit diagram of a scan drive block included in a scan driving device shown in FIG. 9 according to an exemplary embodiment. Referring to FIG. 10, the scan drive block includes a plurality of transistors (M31, M32, M33, M34, M35, M36, M37, M38) and a plurality of capacitors C31 and C32.

The first transistor M31 includes a gate electrode connected to the first node (QB), a first electrode connected to the first power source voltage (VGH), and a second electrode connected to the output terminal (OUT).

The second transistor M32 includes a gate electrode connected to the second node (Q), a first electrode connected to the second clock signal input terminal CLK2, and a second electrode connected to the output terminal (OUT).

The third transistor M33 includes a gate electrode connected to the first node (QB), a first electrode connected to second electrodes of the seventh transistor M37 and the eighth transistor M38, and a second electrode connected to the second node (Q).

The fourth transistor M34 includes a gate electrode connected to the first clock signal input terminal CLK1, a first electrode connected to the second electrodes of the seventh transistor M37 and the eighth transistor M38, and a second electrode connected to the second node (Q).

The fifth transistor M35 includes a gate electrode connected to the first clock signal input terminal CLK1, a first electrode connected to the second power source voltage (VGL), and a second electrode connected to the first node (QB).

The sixth transistor M36 includes a gate electrode connected to the second node (Q), a first electrode connected to the first clock signal input terminal CLK1, and a second electrode connected to the first node (QB).

The seventh transistor M37 includes a gate electrode connected to the forward control signal input terminal (CTL), a first electrode connected to the forward input signal input terminal (IN), and a second electrode connected to the first electrodes of the third transistor M33 and the fourth transistor M34.

The eighth transistor M38 includes a gate electrode connected to the reverse control signal input terminal (CTLB), a first electrode connected to the reverse input signal input terminal (INB), and a second electrode connected to the first electrodes of the third transistor M33 and the fourth transistor M34.

The first capacitor C31 includes a first electrode connected to the second node (Q) and a second electrode connected to the output terminal (OUT).

The second capacitor C32 includes a first electrode connected to the first node (QB) and a second electrode connected to the first power source voltage (VGH).

The first power source voltage (VGH) has the high voltage, and the second power source voltage (VGL) has the low voltage.

Compared to the scan drive block of FIG. 6, the difference is that the first electrode of the fifth transistor M35 is connected to the second power source voltage (VGL) in the low level. By connecting the first electrode of the fifth transistor M35 to the second power source voltage (VGL), a load of the clock signal that is input to the first clock signal input terminal CLK1 for transmitting the low voltage to the first node (QB) can be reduced.

When the clock signal in the low level is input to the first clock signal input terminal CLK1, the fifth transistor M35 for transmitting the low voltage to the first node (QB) functions in a like manner of the fifth transistor M25 of the scan drive block shown in FIG. 6. Therefore, the scan driving device of FIG. 9 can be operated in a like manner of the scan driving device of FIG. 5 described with reference to FIGS. 7 and 8.

By way of summary and review, the scan driving device according to the exemplary embodiments can be driven in connection with the two clock signal lines and one power line, and can reduce the number of wires compared to existing scan driving devices. Accordingly, the scan driving device can output the scan signal with an accurate and stable waveform through a simple operation and can reduce the dead space of the display device.

The drawings and the detailed description described above are examples for the present invention and are provided to explain the present invention, and the scope of the present invention described in the claims is not limited thereto. Therefore, it is understood that various modifications and other equivalent exemplary embodiments may be possible by those who are skilled in the art. Accordingly, the actual scope of the present invention must be determined by the spirit of the appended claims.

What is claimed is:

1. A scan driving device for a display device comprising:

a plurality of scan drive blocks that are sequentially arranged, wherein each of the scan drive blocks includes:

a first transistor including a gate electrode connected to a first node to which a gate on voltage is transmitted according to a clock signal that is input to a first clock signal input terminal, a first electrode connected to a first power source voltage, and a second electrode connected to an output terminal;

a second transistor including a gate electrode connected to a second node to which a signal that is input to an input signal input terminal is transmitted according to the clock signal that is input to the first clock signal input terminal, a first electrode connected to a second clock signal input terminal, and a second electrode connected to the output terminal; and a third transistor including a gate electrode connected to the first node, a first electrode connected to the input signal input terminal, and a second electrode connected to the second node.

2. The scan driving device of claim 1, further including a fourth transistor including a gate electrode connected to the first clock signal input terminal, a first electrode connected to the input signal input terminal, and a second electrode connected to the second node.

3. The scan driving device of claim 2, further including a fifth transistor including a gate electrode connected to the first clock signal input terminal, a first electrode connected to the first clock signal input terminal, and a second electrode connected to the first node.

4. The scan driving device of claim 3, further including a sixth transistor including a gate electrode connected to the second node, a first electrode connected to the first clock signal input terminal, and a second electrode connected to the first node.

5. The scan driving device of claim 4, further including a first capacitor including a first electrode connected to the second node and a second electrode connected to the output terminal.

6. The scan driving device of claim 5, further including a second capacitor including a first electrode connected to the first node and a second electrode connected to the first power source voltage.

7. The scan driving device of claim 2, further including a fifth transistor including a gate electrode connected to the first clock signal input terminal, a first electrode connected to the second power source voltage, and a second electrode connected to the first node.

8. The scan driving device of claim 1, wherein the input signal input terminal includes a first input signal input terminal for receiving a scan signal of a scan drive block that is preemptively arranged from among the plurality of scan drive blocks, and a second input signal input terminal for receiving a scan signal of a scan drive block that is arranged afterward.

9. The scan driving device of claim 8, further including a seventh transistor including a gate electrode connected to a forward control signal input terminal for receiving a forward control signal for instructing a forward scan drive, a first electrode connected to the first input signal input terminal, and a second electrode connected to the first electrode of the third transistor.

10. The scan driving device of claim 9, further including an eighth transistor including a gate electrode connected to a reverse control signal input terminal for receiving a reverse control signal for instructing a reverse scan drive, a first electrode connected to the second input signal input terminal, and a second electrode connected to the first electrode of the third transistor.

11. A method for driving a scan driving device including a plurality of scan drive blocks, each of the scan drive blocks including a first transistor having a gate electrode connected to a first node to which a gate on voltage is transmitted according to a clock signal that is input to a first clock signal input terminal and transmitting a first power source voltage to an output terminal, a second transistor having a gate electrode connected to a second node and transmitting a clock signal that is input to a second clock signal input terminal to the output terminal, and a third transistor having a gate electrode connected to the first node and transmitting a signal that is input to an input signal input terminal to the second node, the method comprising:

applying the clock signal that is input to the first clock signal input terminal and the signal that is input to the input signal input terminal as a gate on voltage, and applying the clock signal that is input to second clock signal input terminal as a gate off voltage;

transmitting the gate on voltage to the first node according to the clock signal that is input to the first clock signal input terminal and transmitting the signal that is input to the input signal input terminal to the second node to reset the first node and the second node with the gate on voltage; and outputting a scan signal of a gate off voltage to the output terminal through the first transistor and the second transistor.

12. The method of claim 11, further including charging a first capacitor connected to the second node and the output terminal by a gate on voltage at the second node and a gate off voltage at the output terminal.

13. The method of claim 12, further including:

applying the clock signal that is input to the first clock signal input terminal and the signal that is input to the first input signal input terminal as a gate off voltage;

applying the clock signal that is input to the second clock signal input terminal as a gate on voltage; and outputting the clock signal that is input to the second clock signal input terminal to the output terminal as a scan signal of the gate on voltage by a bootstrap caused by the first capacitor.

14. The method of claim 13, further including:

transmitting the clock signal that is input to the first clock signal input terminal to the first node by the bootstrap caused by the first capacitor; and turning off the first transistor and the third transistor.

15. The method of claim 13, further including:

when the scan signal with the gate on voltage is output, applying the clock signal that is input to the first clock signal input terminal as the gate on voltage, and applying the signal that is input to the input signal input terminal as the gate off voltage;

transmitting the gate on voltage to the first node by the clock signal that is input to the first clock signal input terminal;

turning on the third transistor to transmit the gate off voltage to the second node; and turning on the first transistor to output the scan signal with the gate off voltage to the output terminal.

16. The method of claim 15, further including charging a second capacitor connected to the first node and the first power source voltage with the gate on voltage at the first node and the gate off voltage at the output terminal.

17. The method of claim 16, further including maintaining the first transistor and the third transistor in the turned on state by the voltage charged in the second capacitor.

18. The method of claim 11, wherein the input signal input terminal includes a first input signal input terminal for receiving a scan signal of a preemptively arranged scan drive block from among the scan drive blocks and a second input signal input terminal for receiving a scan signal of a scan drive block that is arranged afterward, and transmitting of the signal that is input to the input signal input terminal to the second node includes transmitting a signal that is input to the first input signal input terminal to the second node according to a forward control signal for instructing a forward scan drive.

19. The method of claim 11, wherein:

the input signal input terminal includes a first input signal input terminal for receiving a scan signal of a preemptively arranged scan drive block from among the scan drive blocks and a second input signal input terminal for receiving a scan signal of a scan drive block that is arranged afterward, and transmitting of the signal that is input to the input signal input terminal to the second node includes transmitting a signal that is input to the second input signal input terminal to the second node according to a reverse control signal for instructing a reverse scan drive.

20. An apparatus, comprising:

a first circuit to apply a first clock signal to a first clock signal input terminal of a driver and a input signal to an input signal input terminal of the driver as a gate on voltage, and to apply a second clock signal to a second clock signal input terminal of the driver as a gate off voltage;

a second circuit to transmit the gate on voltage to a first node of the driver based on the first clock signal, and to transmit the input signal to a second node of the driver to reset the first node and the second node based on the gate on voltage; and a third circuit to output a scan signal of a gate off voltage to an output terminal of the driver, wherein the driver includes at least one scan drive block which includes:

the at least one scan driver block includes a first transistor having a gate electrode connected to the first node to receive the gate on voltage based on the first clock signal, an output terminal to receive a first power source voltage, a second transistor having a gate electrode connected to the second node, a third transistor having a gate electrode connected to the first node, and the input signal input terminal is connected to the second node and the second clock signal input terminal is connected to the output terminal.

* * * * *